United States Patent
Williamson et al.

(10) Patent No.: US 7,334,758 B2
(45) Date of Patent: Feb. 26, 2008

(54) ATTACHMENT ASSEMBLY FOR MOUNTING A SEAT TO THE FLOOR OF A VEHICLE

(75) Inventors: John Williamson, Davie, FL (US); Kurt Anglese, Miami, FL (US); Scott Cummings, Fort Lauderdale, FL (US)

(73) Assignee: B/E Aerospace, Inc., Wellington, FL (US)

( * ) Notice: Subject to any disclaimer, the term of this patent is extended or adjusted under 35 U.S.C. 154(b) by 0 days.

(21) Appl. No.: 10/944,487

(22) Filed: Sep. 17, 2004

(65) Prior Publication Data
US 2005/0109877 A1    May 26, 2005

Related U.S. Application Data

(60) Provisional application No. 60/509,402, filed on Oct. 6, 2003.

(51) Int. Cl.
*B64D 11/06* (2006.01)

(52) U.S. Cl. .................. 244/118.6; 297/452.18

(58) Field of Classification Search ............. 244/118.6; 297/452.18, 452.2; 248/503, 500, 424
See application file for complete search history.

(56) References Cited

U.S. PATENT DOCUMENTS

| | | | |
|---|---|---|---|
| 4,771,969 A * | 9/1988 | Dowd | 244/118.6 |
| 4,856,738 A | 8/1989 | Martin | |
| 4,911,381 A * | 3/1990 | Cannon et al. | 244/122 R |
| 4,913,489 A | 4/1990 | Martin | |
| 5,058,829 A * | 10/1991 | Bentley | 244/122 R |
| 5,169,091 A | 12/1992 | Beroth | |
| 5,178,346 A | 1/1993 | Beroth | |
| 5,337,979 A | 8/1994 | Bales et al. | |
| 5,558,301 A | 9/1996 | Kerdoncuff et al. | |
| 5,624,160 A | 4/1997 | Koch et al. | |
| 5,676,336 A | 10/1997 | Nefy et al. | |
| 5,762,244 A | 6/1998 | Wagner et al. | |
| 5,871,318 A | 2/1999 | Dixon et al. | |
| 5,921,629 A | 7/1999 | Koch et al. | |
| 6,227,489 B1 | 5/2001 | Kitamoto et al. | |
| 6,412,864 B1 | 7/2002 | Larson | |
| 6,669,143 B1 | 12/2003 | Johnson | |
| 2003/0132346 A1 | 7/2003 | Lambiaso | |

OTHER PUBLICATIONS

U.S. Appl. No. 10/943,272, filed Sep. 17, 2004, Williamson et al.
U.S. Appl. No. 10/943,672, filed Sep. 17, 2004, Meneses et al.
U.S. Appl. No. 10/944,134, filed Sep. 17, 2004, Williamson et al.
U.S. Appl. No. 10/944,488, filed Sep. 17, 2004, Williamson et al.

* cited by examiner

*Primary Examiner*—Timothy D. Collins
(74) *Attorney, Agent, or Firm*—Drinker Biddle & Reath LLP

(57) ABSTRACT

An attachment assembly for mounting a seat frame to a floor of a vehicle, the assembly including a floor mount secured to the floor, a foot fitting connected to the floor mount, the foot fitting having a connection portion adapted to mate with a leg of a seat frame, the connection portion having an opening extending therethrough, and an articulating connection attached to the leg portion and extending through the opening in the connection portion. An articulating foot fitting is also disclosed.

18 Claims, 19 Drawing Sheets

ATTACHMENT ASSEMBLY FOR MOUNTING A SEAT TO THE FLOOR OF A VEHICLE

CROSS-REFERENCE TO RELATED PATENT APPLICATIONS

This patent application claims priority from U.S. Provisional Patent Application No. 60/509,402 filed Oct. 6, 2003, entitled AIRPLANE PASSENGER SEAT. Related subject matter is disclosed in copending U.S. patent application Ser. No. 10/944,134, filed Sep. 17, 2004, entitled A CURVED PROFILE TRACKING PLATFORM FOR A PASSENGER SEAT; U.S. patent application Ser. No. 10/944,488, filed Sep. 17, 2004, entitled INDEPENDENT DIVAN DOOR AND DRAWER ASSEMBLY; U.S. patent application Ser. No. 10/943,272, filed Sep. 17, 2004, entitled FLEXIBLE SEAT FRAME; and U.S. patent application Ser. No. 10/943,672, filed Sep. 17, 2004, entitled ADJUSTABLE SEAT BELT GUIDE ASSEMBLY.

FIELD OF THE INVENTION

This invention pertains to aircraft seating and, more particularly an energy absorbing aircraft seat frame.

BACKGROUND OF THE INVENTION

In order for aircraft seating to be certified for use in an aircraft, the seat must pass a series of performance tests to ensure that it will withstand the various dynamic forces that it may be subjected to, particularly in an emergency situation. In order to be certified as airworthy, aircraft seating designs must pass a series of dynamic tests that simulate aircraft deformation and impulse during emergency conditions. The airworthiness standards for seat structures are described in Federal Aviation Regulation § 25.562, the contents of which is incorporated herein.

Because of the standards set forth in FAR § 25.562, aircraft seating must be strong enough not only support the weight of the seat occupant, but also to withstand the various load forces that are generated as a result of maneuvers performed by the pilot during flight, upon landing or, more importantly, in the event of an emergency. These various load forces are known as g-forces and result from the forces of acceleration that pull on the seat and its occupant when changes occur in the motion of the aircraft.

G-forces can be either positive or negative and can result from either an acceleration or deceleration of the aircraft. Most individuals involved in aviation are familiar with the positive g forces that result from an aircraft being pulled through a tight radius of turn. In such a turn, the force of the acceleration is increased as greater lift is required to maintain level flight in the turn. This acceleration is a function of the velocity of the aircraft and the radius of the turn and is determined by the equation:

$$a = v^2/r$$

where a is the acceleration force, v is the velocity of the aircraft and r is the radius of the turn. This acceleration force a is then divided by g (32 ft/s$^2$) to determine the number of g's resulting from the turn. The number of g's is the multiplier used to determine the weight of an object as a result of the increased acceleration. For example, under a load of 4 g's, an object weighing 10 pounds will feel as though it weighs 40 pounds.

In addition to acceleration loads encountered in a turn, g loads are also experienced during periods of rapid acceleration or deceleration such as occurs during the takeoff and landing phase of a flight. These g forces, which act laterally to the aircraft and its occupants, exert a rearward force with respect to the aircraft during periods of acceleration, thereby forcing one back into the seat on takeoff, and a forward force during the period of deceleration on landing, thereby pulling one forward in the seat.

During a normal take-off and landing evolution, a passenger absorbs this g-loading by either pressing back in the seat or leaning forward. In the event of an emergency or crash landing, however, the seat frame itself must be capable of absorbing a load of up to 16 g's without being deformed or, even worse, snapped out of the floor of the aircraft. This is particularly true of a sideways facing seat such as a divan used in general aviation and business jet type aircraft.

While a passenger absorbs the g-load by either pressing back in the seat or leaning forward, the seat frame itself must absorb the load in order to prevent it from being deformed or, even worse, snapped out of the floor of the aircraft. Conventional seats are mounted to the floor of the aircraft cabin in such a manner that there is no "give" in the seat that would allow it to absorb the dynamic forces resulting from an emergency or crash landing. Because of this, the passenger absorbs all of the dynamic forces as he is pulled forward in a seat during an emergency landing.

In a side facing divan, such as is used on a general aviation aircraft, the occupant is not pushed back into the seat on takeoff, but rather slides to their right or left depending on which side of the aircraft they are sitting. Because the seat is attached to the floor using a fixed L or T-shaped foot fitting, the seat frame is subject to greater deformation as it is unable to move to absorb the dynamic loads generated by an emergency or hard landing. For this reasons, a passenger seat that is attached to the floor of an aircraft so as to allow for some rotational freedom to help absorb the g forces while having a self-aligning capability would be an important improvement in the art.

BRIEF SUMMARY OF THE INVENTION

The invention is directed to an attachment assembly for mounting a seat frame to a floor of a vehicle so as to allow the seat to absorb some of the dynamic load imparted on the seat during an emergency stop, in particular, the attachment assembly allows a seat to be mounted to the floor of an aircraft so as to absorb dynamic loads imparted during the operation of an aircraft, particularly during takeoff and landing, and more particularly, during an emergency or crash landing. The attachment assembly is comprised of a foot fitting connected to the floor, the foot fitting having a connection portion adapted to mate with a leg of the aircraft seat frame, the connection portion having an opening extending therethrough, and an articulating connection attached to the leg portion and extending through the opening in the connection point.

In another embodiment, the invention is directed to an attachment assembly that is comprised of a floor track located on a floor of a vehicle and a foot fitting having a connection portion adapted to mate with the leg frame, the connection portion having an opening extending therethrough. At least one seat track fastener capable of being secured in the floor track extends from a bottom of the foot fitting. An articulating connection is attached to the leg portion and extends through the opening in the connection portion.

In still another embodiment, the invention involves a floor mounted fitting for a seat, the mounting fitting is comprised of a base having at least one floor attachment point, and a connection portion adapted to mate with a leg of the seat. The connection portion extends from the base and has an opening therethrough. A fastener that extends from the at least one floor attachment point secures the base to the floor, and an articulating connection that is attached to the leg of the seat extends through the opening in the connection portion.

Yet another embodiment of the invention is directed to a kit for mounting a seat to a floor of a vehicle, the kit comprised of at least one floor mount secured to the floor of the vehicle, a front and rear foot fitting each attached to the floor mount by at least one fastener and secured to the floor by an engagement screw. Each of the foot fittings have a base member with a connection portion having an opening extending therethrough. A pivoting connector is located within the opening and attached to the seat.

BRIEF DESCRIPTION OF THE DRAWINGS

FIG. 12 is a cut-away view of the foot fitting shown in FIG. 10.

DETAILED DESCRIPTION OF THE INVENTION

Figure 1:
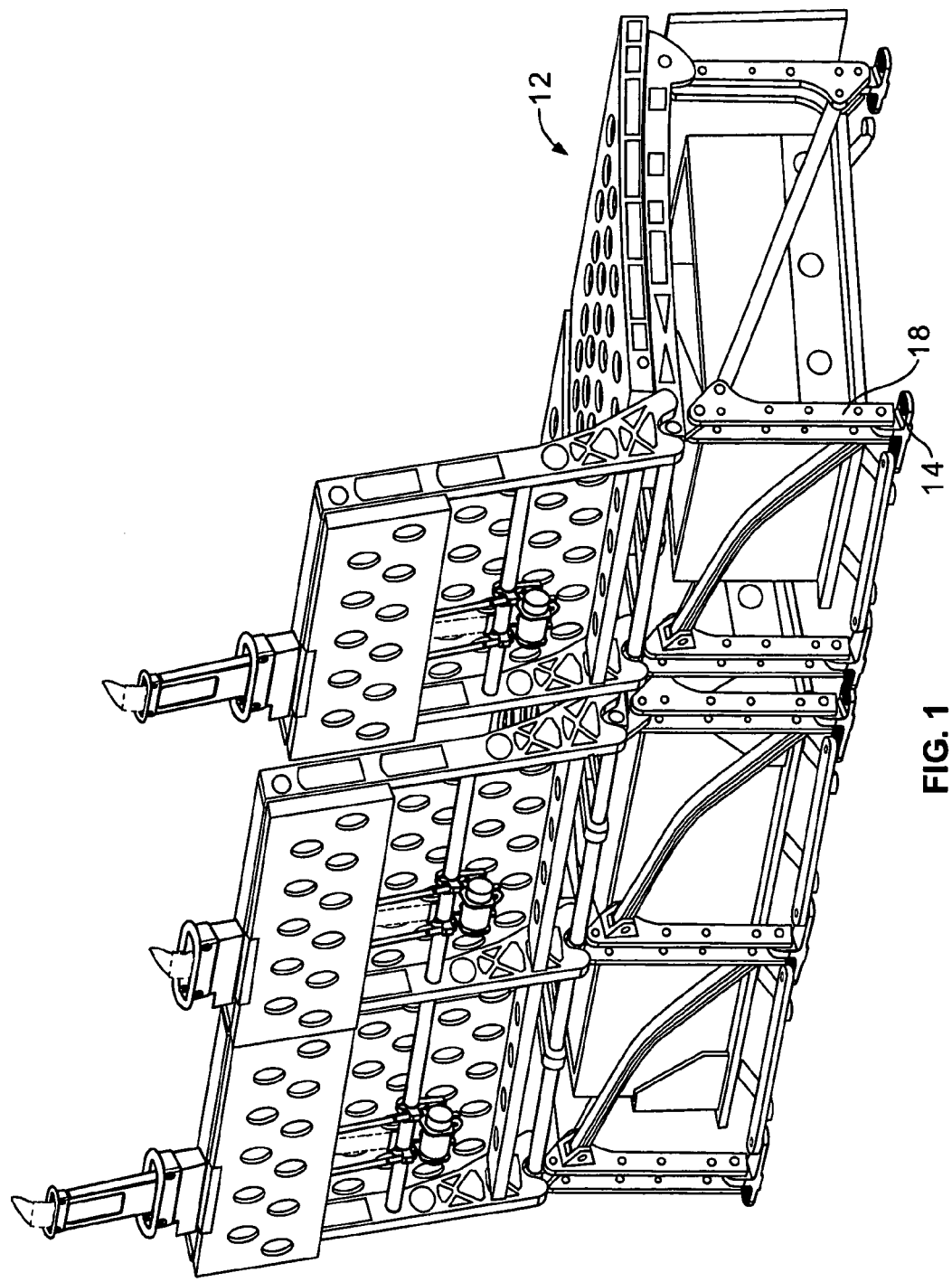
FIG. 1 is a perspective view of a seat frame attached to the floor of a vehicle with a foot fitting that is the subject of this invention.

In order to better understand the invention, it is helpful to review the forces acting on an airplane during takeoff and landing. During the takeoff roll, various forces act on the aircraft. These forces included the thrust (T) that is produced by the aircraft's power plant. In addition to thrust, lift (L) and drag (D) are produced as soon as the airplane has speed depending on the angle of attack and dynamic pressure. Rolling friction (F) results when there is a normal force on the wheels and is the product of the normal force and the coefficient of the rolling friction. The normal force pressing the wheels against the runway surface is the net of weight and lift while the rolling friction coefficient is a function of the tire type and runway surface texture.

The acceleration of the airplane at any instant during takeoff roll is a function of the net accelerating force and the airplane mass. Thus, from Newton's second law of motion:

$$a = F_n/M$$

or $$a = g(F_n/W)$$

where:
a=acceleration (ft/sec²)
$F_n$=net accelerating force (lbs)
W=weight (lbs)
g=gravitational acceleration (32.17 ft/sec²)
M=mass (slugs i.e., W/g)

The net accelerating force on an airplane ($F_n$) is the net of thrust (T), drag (D), and rolling friction (F). Therefore, the acceleration at any instant during takeoff roll is:

$$a=(g/W)(T-D-F)$$

For the case of uniformly accelerated motion—a case which compares closely with the performance of a jet airplane—distance along the takeoff roll is proportional to the square of the velocity ($V^2$) hence velocity squared and distance can be used almost synonymously. Thus, lift and drag will vary linearly with dynamic pressure (q) or $V^2$ from the point of beginning takeoff roll. As the rolling friction coefficient is essentially unaffected by velocity, the rolling friction will vary as the normal force on the wheels. At zero velocity, the normal force on the wheels is equal to the airplane weight, however, at takeoff velocity, the lift is equal to the weight and the normal force is zero. Therefore, rolling friction decreases linearly with q or $V^2$ from the beginning of takeoff roll and reaches zero at the point of takeoff.

As a result, the total retarding force on the aircraft is the sum of drag and rolling friction (D+F) and, for the majority aircraft configurations, this sum is nearly constant or changes only slightly during the takeoff roll. Therefore, the net accelerating force is then the difference between the power plant thrust and the total retarding force:

$$F_n=T-D-F$$

The acceleration of an aircraft during the landing roll is negative (deceleration). At any instant during the landing roll, the acceleration is a function of the net retarding force and the airplane mass or as stated from Newton's second law of motion:

$$a+F_r/M$$

or $$a+g(F_r/W)$$

where:
a=negative acceleration (ft/sec²)
$F_r$=net retarding force (lbs.)
g=gravitational acceleration (ft/sec²)
W=weight (lbs.)
M=mass (slugs i.e., W/g)

The net retarding force on the airplane ($F_r$) is the net of drag (D), braking friction (F), and thrust (T). Thus, negative acceleration at any time during the landing roll is:

$$a=(g/W)(D+F-T)$$

In the event of an emergency landing or crash landing, the drag and friction factors can by very high as no wheels may be in contact with the landing surface. This greatly increases the amount of negative acceleration resulting in a very large increase in g-forces that must be absorbed by the aircraft and everything within it.

The invention, as shown in FIGS. 1-14, is directed to an attachment assembly 10 used to mount a seat frame 12 to the floor of a vehicle (not shown) so as to allow the seat 12 to better absorb lateral g-forces. In particular, the assembly 10 is used to mount a seat frame 12 to the floor of an aircraft, more particularly an airplane, so as to allow the seat frame 12 to better absorb the forces described above that are imposed upon it as a result of takeoffs and landings, in particular, emergency or crash landings.

Figure 2:
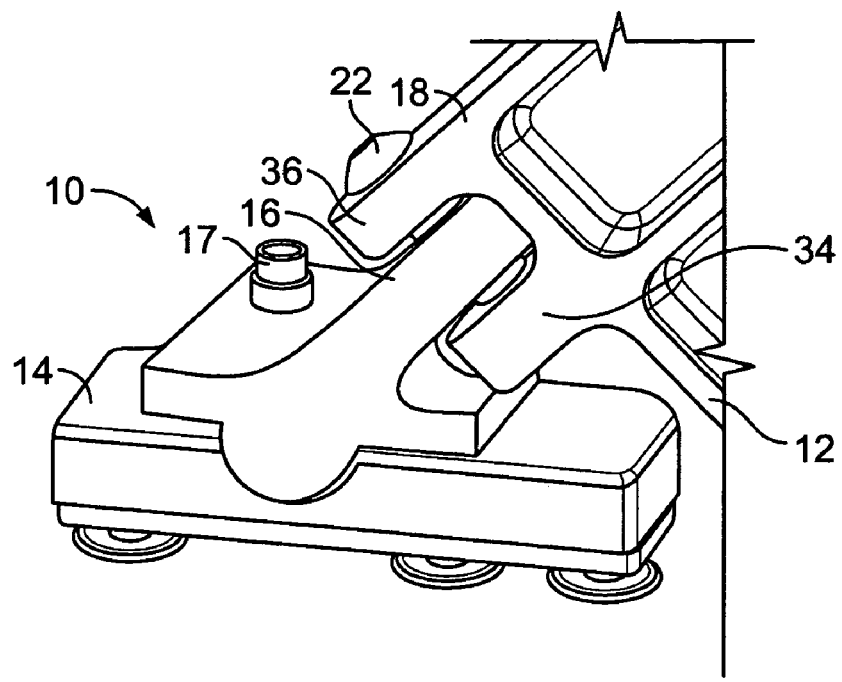
FIG. 2 is a perspective view of a foot fitting showing the fitting attached to the leg portion of a seat frame.
Figure 3:
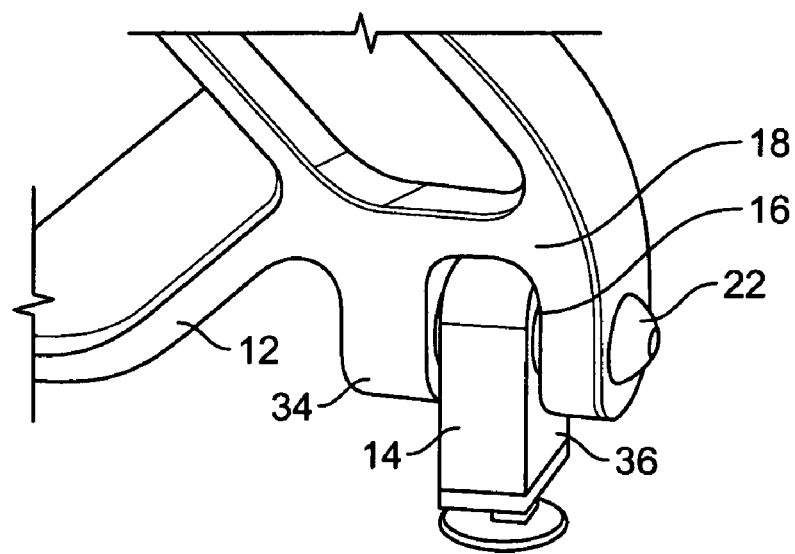
FIG. 3 is a perspective of a second embodiment of the foot fitting.

As shown in FIGS. 1-3, the attachment assembly is capable of mounting to a floor track (not shown) on a floor of the vehicle, and is comprised of a foot fitting 14 having a connection portion 16 adapted to mate with the leg 18 of a seat frame 12, the connection portion having an opening extending therethrough, at least one seat track fastener 15 extending from a bottom of the foot fitting 14, the at least one seat track fastener 15 capable of being secured in the floor track, and an articulating connection 22 attached to the leg portion 18 and extending through the opening in the connection portion 16. In one version of this embodiment, a screw 17, in particular a retaining screw may be used to secure the foot fitting 14 to the floor.

In still another version of the invention, the connection portion 16 extends from the foot fitting 14 at approximately a 45° angle, as shown in FIG. 2. The leg frame 18 may terminate in a fork having a first and a second attachment prong 34, 36 spaced apart from one another. The connection portion 16 is then positioned in the space between the first and second prong 34, 36, as shown in FIGS. 2 and 3. The articulating connection 22 extends through the opening in the connection portion 16 and includes a first and second end that attaches to the first and second prongs 34, 36 of the leg frame 18, respectively. In another version of the embodiment, each of the attachment prongs 34, 36 defines a hole and the articulating connection 22 extends through the opening in the connection portion and the holes in the attachment prongs 34, 36.

Figure 4:
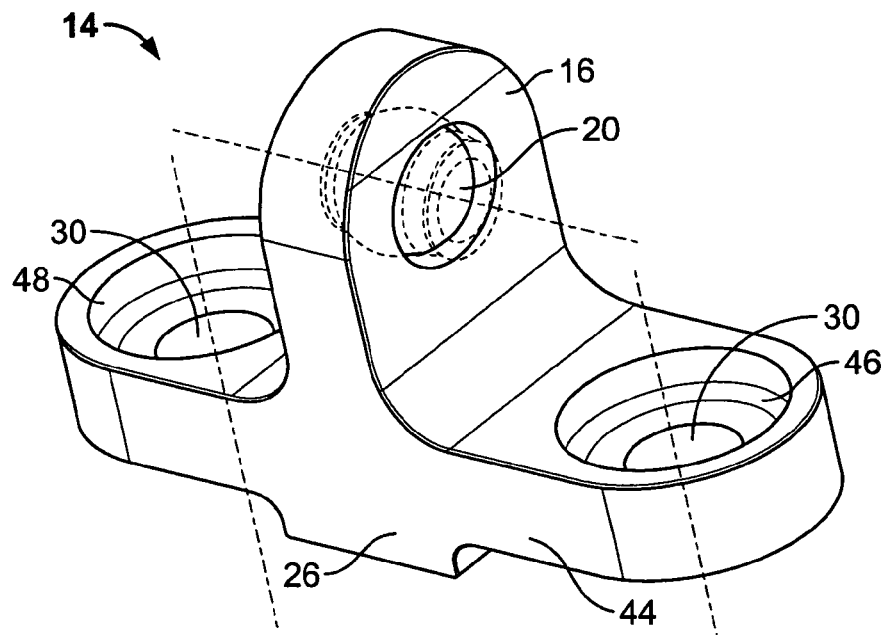
FIG. 4 is a perspective view of the foot fitting showing the bushing positioned in the opening of the connection portion of the fitting.
Figure 5:
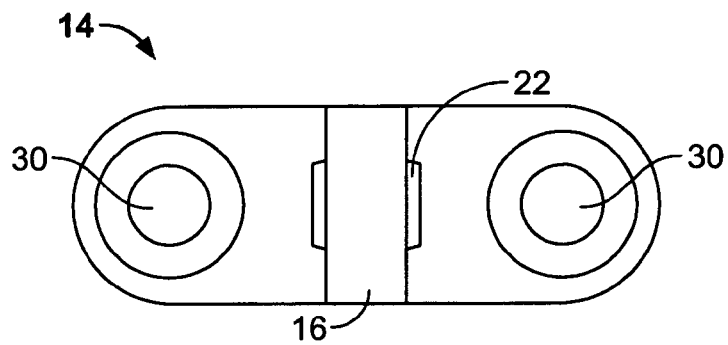
FIG. 5 is a top view of the foot fitting.

In still another embodiment of the invention, as shown in FIGS. 4-8, the foot fitting 14 has a base 44 having a first and a second attachment point 46, 48 with the connection portion 16 extending from the base 44 between the first and second attachment points 46, 48. In a particular version of this embodiment, the attachment points 46, 48 have an opening 30 therethrough, as shown in FIGS. 3 and 4. First and second parallel axis extend through the first and second attachment opening 30, respectively while a third axis extends perpendicular to the first and second axes through the opening 20 in the connection portion 16. Retaining screws 32 extend through the first and second attachment openings 30 to secure the foot fitting 14 to the floor of the aircraft, as shown in FIGS. 9(a) and (b).

The invention also includes a floor mounted fitting 14 for a seat frame 12. The fitting 14, as shown in FIGS. 4 and 6-9(b), is comprised of a base 44 having at least one track engagement portion 26, a connection portion 16 adapted to mate with a leg 18 of the aircraft seat frame 12 (see FIG. 8), the connection portion 16 extending from the base 44 and having an opening 20 therethrough. In another embodiment, as shown in FIGS. 9(a) and (b), a fastener 32 extends from at least one floor attachment point 46 in the base 44 and secures the base 44 to the floor, and an articulating connection 22 extends through the opening 20 in the connection portion 16 and attaches to the leg 18 of the seat frame 12. In another version of the embodiment, the base 44 includes a first and second attachment opening 46, 48 and the connection portion 16 extends from the base 44 between the first and second attachment openings 46, 48.

Figure 9A:
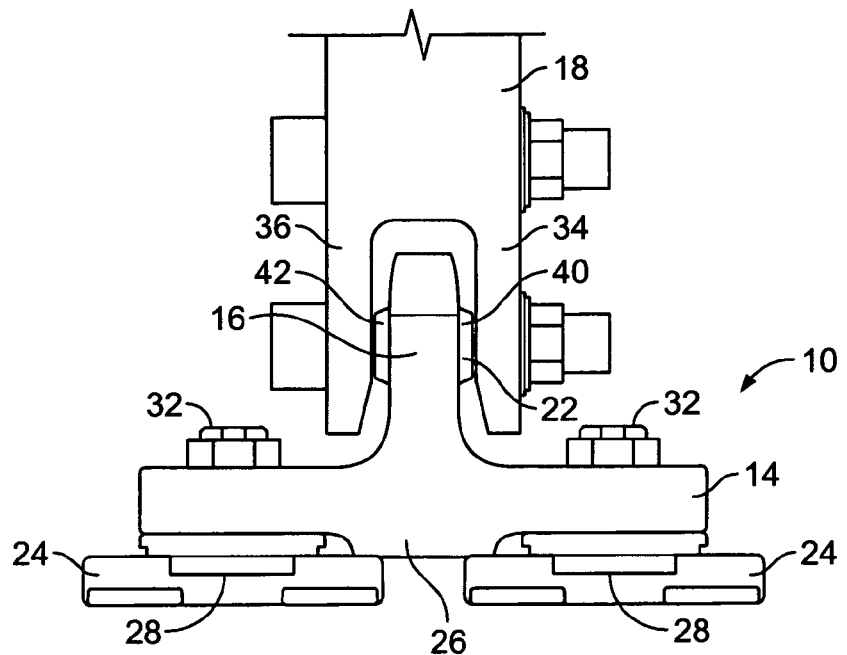
FIG. 9(a) is a side view showing the foot fitting attached to the floor mount and the leg of the seat frame in a neutral unloaded position.

The attachment assembly may also include a floor mount 24 secured to the floor of the aircraft, as shown in FIG. 9(a), (b) and 14, with the foot fitting 14 connected to the floor mount 24.

Figure 6:
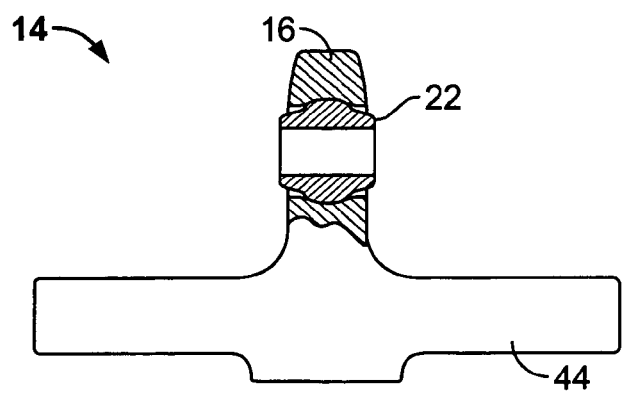
FIG. 6 is a front view of the foot fitting.
Figure 7:
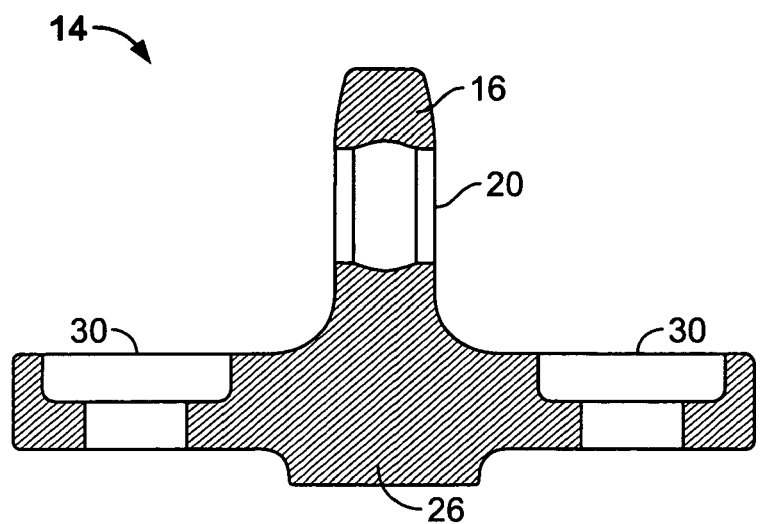
FIG. 7 is a sectional view taken along line 7-7 of FIG. 4.

As shown in FIG. 6, the articulating connection 22 may be a bushing. This bushing can be manufactured out of any suitable material known in the art including, but not limited to, bronze. The bushing may also be swaged in place so that it is free to rotate in the opening 20 in the connection portion 16 of the foot fitting 14.

At least one track engagement portion 26 capable of being secured in the floor mount 24 may extend from the bottom of the foot fitting 14, as shown in FIGS. 4 and 6. In one embodiment, the floor mount 24 may be in the form of a track assembly, as shown in FIGS. 9(a) and (b). This track assembly 24 may have a plurality of openings 28 so as to allow the foot fitting 14 to be connected to the floor of the aircraft in a number of places. The at least one track engagement portion 26 may be positioned in the track assembly 24 so as to secure the fitting 14 to the floor or, it may be positioned adjacent to the track assembly 24 as shown in FIGS. 9(a) and (b).

As shown in FIGS. 4-8, the foot fitting 14 may include at least one attachment opening 30 and a retaining screw 32, shown in FIGS. 9(a) and (b), extends through the at least one attachment opening 30 into the floor mount 24, thereby securing the foot fitting 14 to the floor mount 24 and the aircraft.

Figure 8:
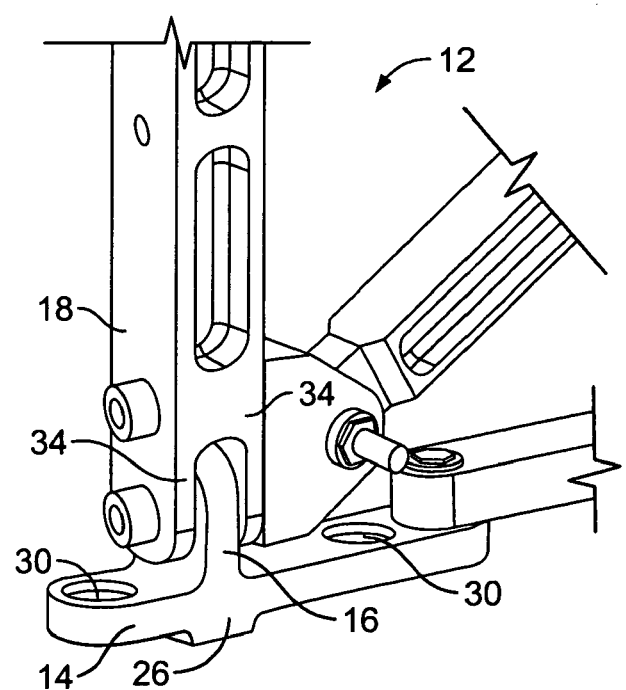
FIG. 8 is a perspective view of the attachment assembly showing the foot fitting secured to a track assembly floor mount and the leg of the seat frame articulating about the connection portion of the foot fitting.

As is shown in FIGS. 8 and 9(a) and (b), the leg 18 of the aircraft seat frame 12 may terminate in a fork having a first and a second prong 34, 36 spaced apart from one another. When in operation, the foot fitting 14 is aligned in the appropriate position with the floor mount 24. This alignment is such that the connection portion 16 of the foot fitting 14 is positioned in the space 38 between the first and second prong 34, 36 of the leg frame 18 when the aircraft seat frame 12 is positioned over the foot fitting 14. Once aligned with the floor mount 24, the foot fitting 14 is secured to the mount 24 by engaging the at least one fastener 26 in the mount 24 or, as shown in FIGS. 9(a) and (b), by the use of retaining screws 32 to hold the fitting 14 in place on the mount 24.

The articulating connection 22 that extends through the opening 20 in the connection point 16 includes a first and a second end 40, 42, each of which is attached to the first and second prongs 34, 36 of the leg frame 18, respectively, as shown in FIG. 9(a). Because the width of the space 38 between the first and second prongs 34, 36 is less that then length of the prongs 34, 36, the leg 18 of the seat frame 12 is free to articulate or rotate back and forth above the connection portion 16 of the foot fitting 14 in order to absorb the dynamic loads that are exerted on the seat frame 12 as a result of the aircraft's acceleration or deceleration.

Figure 9B:
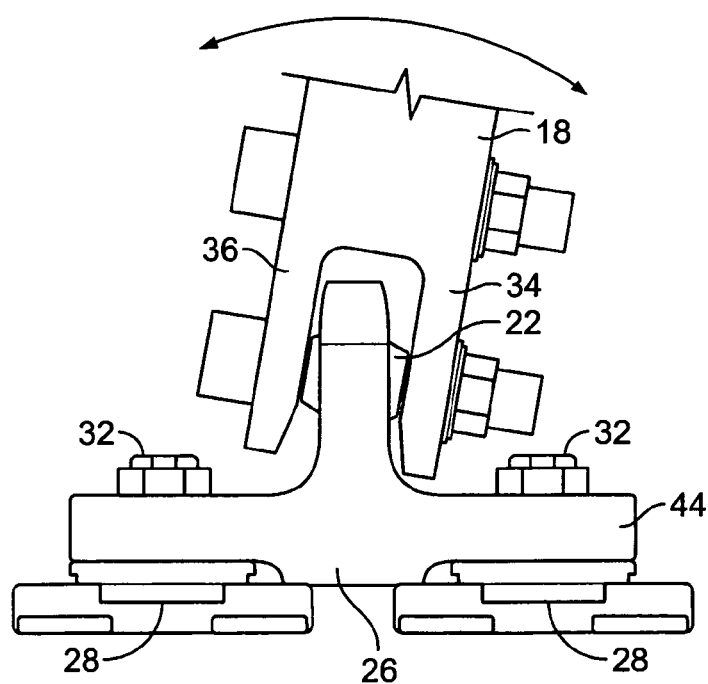
FIG. 9(b) is a side view showing the leg of the seat frame in a loaded condition articulating about the connection portion of the foot fitting.
Figure 10:
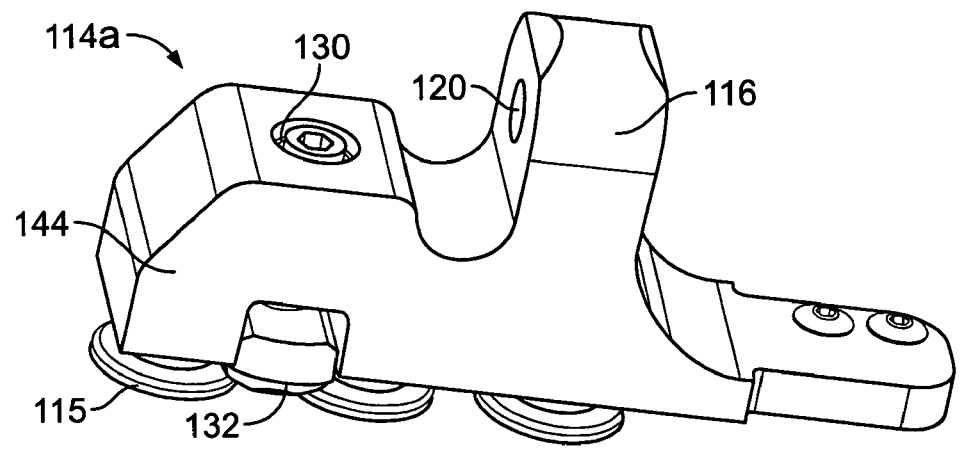
FIG. 10 is a perspective view of a yet another embodiment of a foot fitting used in conjunction with the rear leg of a seat frame.
Figure 11:
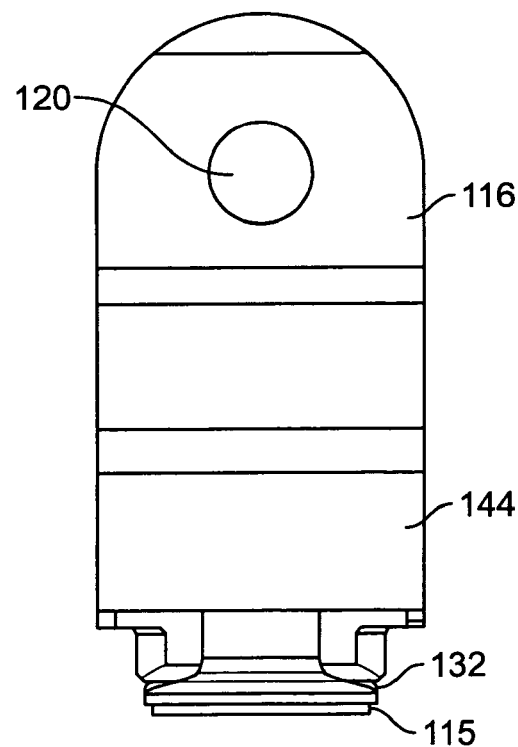
FIG. 11 is a front view of the foot fitting shown in FIG. 10.
Figure 12:
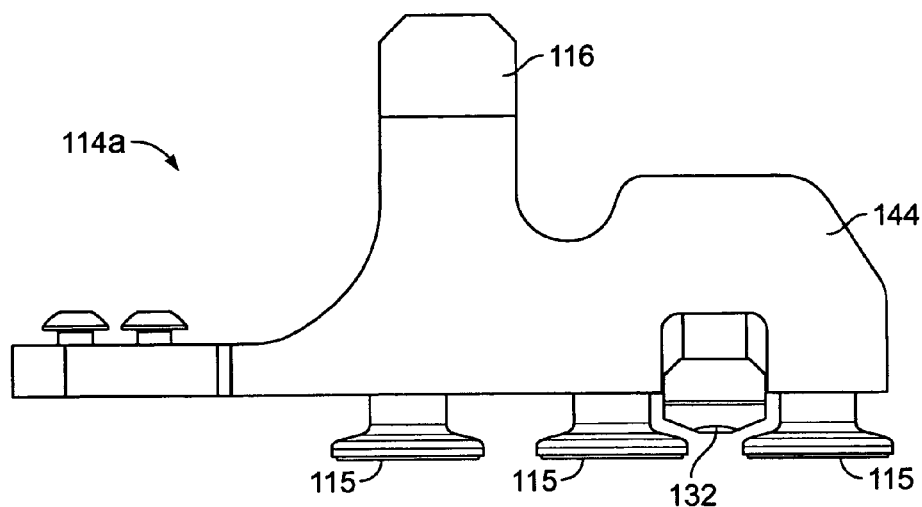
FIG. 12 is a side view of the foot fitting shown in FIG. 10.
Figure 13:
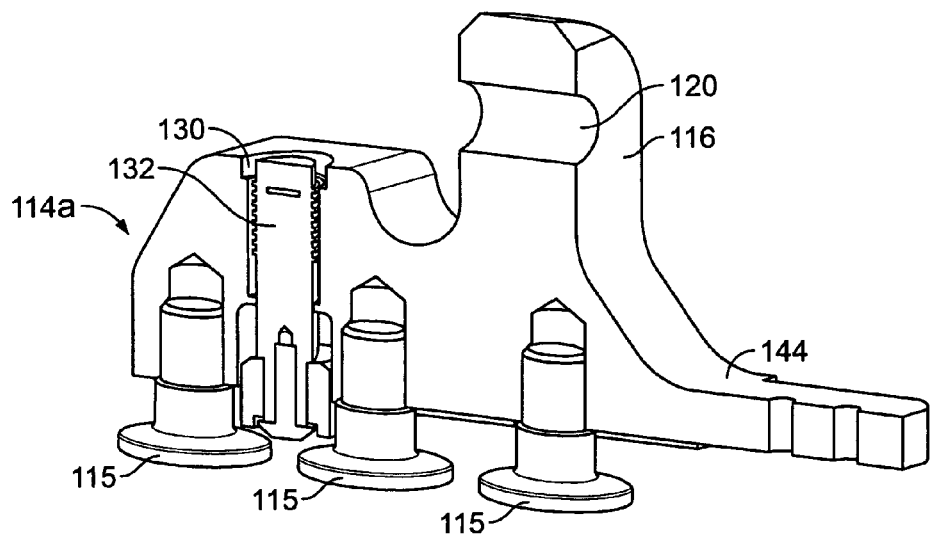
FIG. 13 is a perspective view showing one embodiment of the foot fitting secured in a track assembly and attached to a leg portion of a seat frame.
Figure 14:
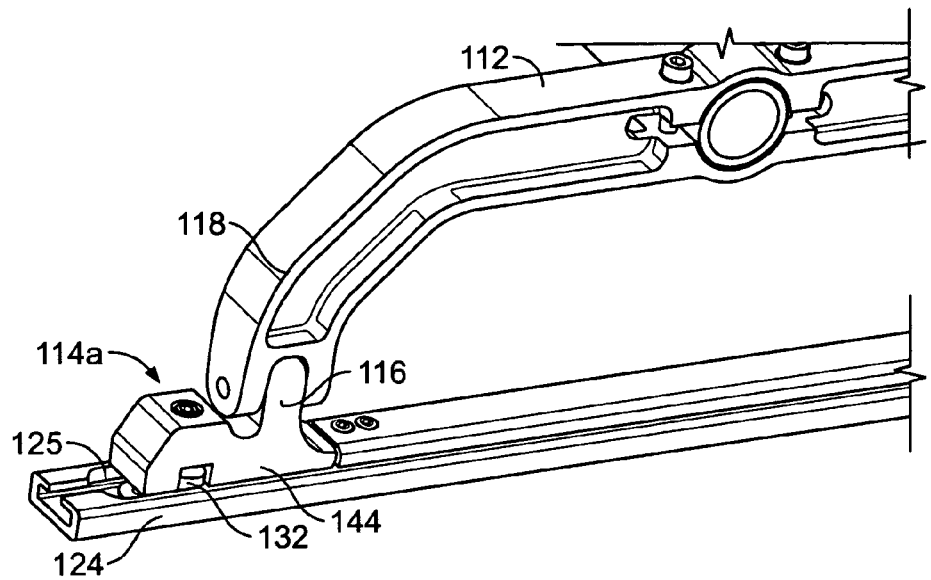
FIG. 14 is a perspective view showing the foot fitting attached to the leg of a seat frame and secured to a floor-mounted track assembly.
Figure 15:
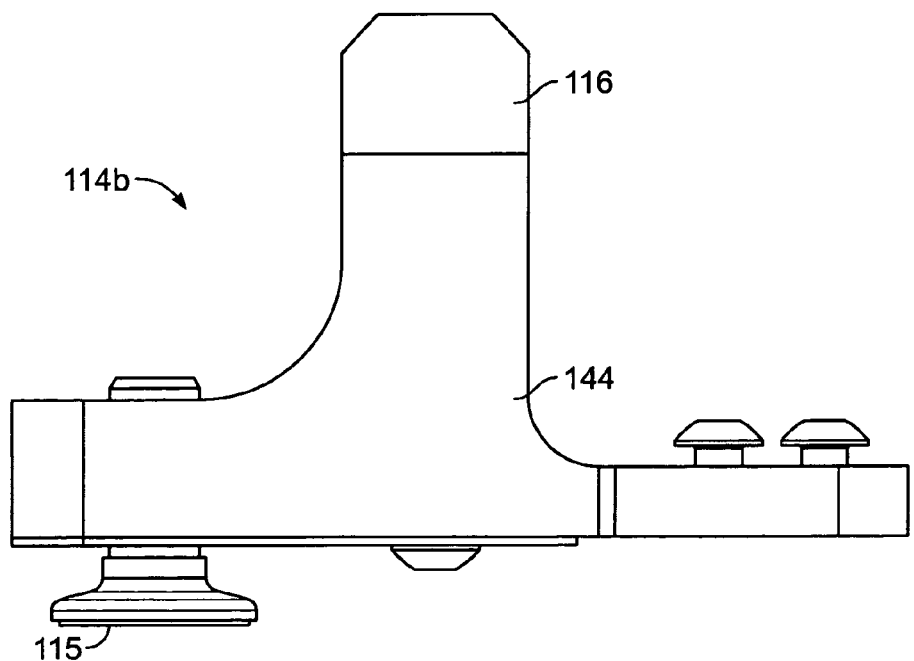
FIG. 15 is a side view of a foot fitting used in conjunction with the front leg of a seat frame.
Figure 16:
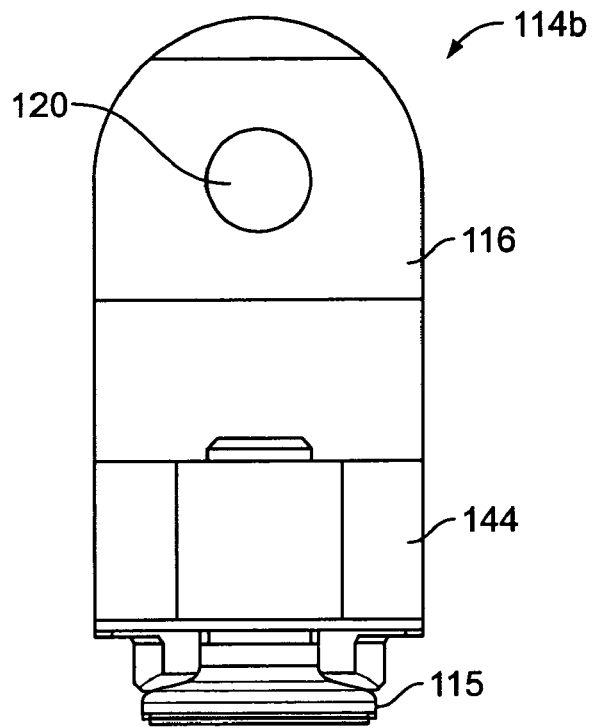
FIG. 16 is a front view of the foot fitting shown in FIG. 15.
Figure 17:
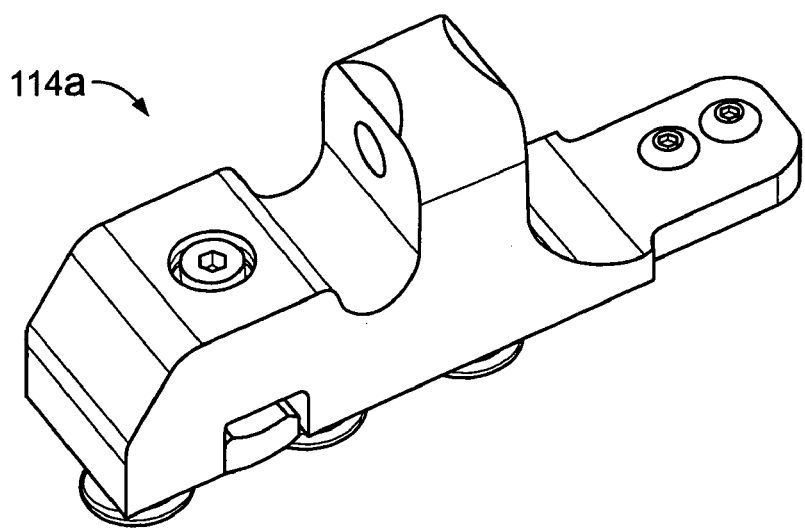
FIG. 17 is a perspective view of one embodiment of a foot fitting used as a rear fitting.
Figure 18:
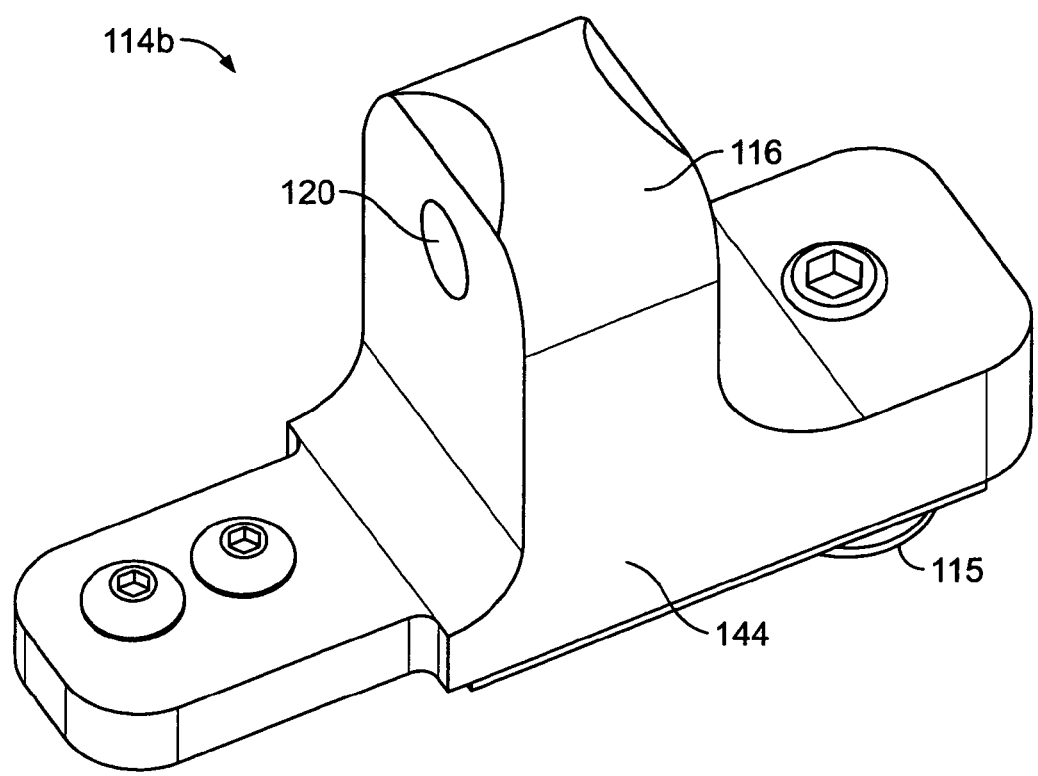
FIG. 18 is a perspective view of one embodiment of a foot fitting used as a front fitting.
Figure 19:
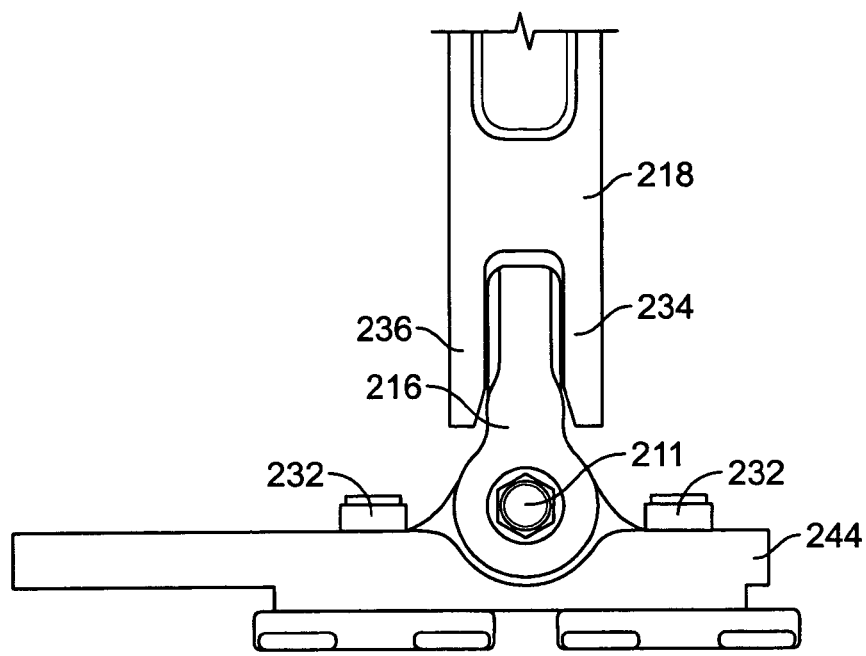
FIG. 19 is a side view of one embodiment of the foot fitting attached to the floor mount and the leg of the seat frame in a neutral unloaded position.
Figure 20:
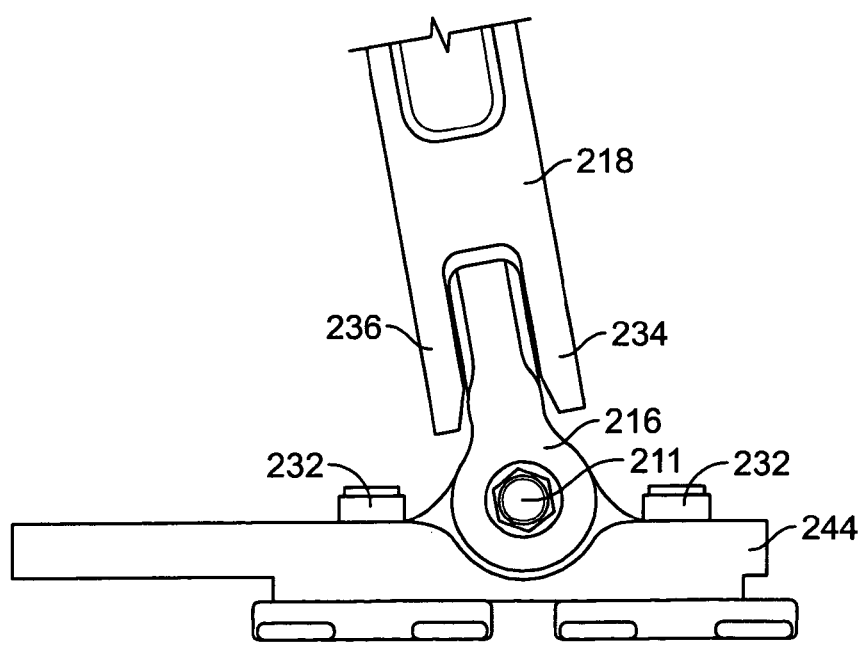
FIG. 20 is a side view of one embodiment of the foot fitting attached to the floor mount and the leg of the seat frame in a loaded condition articulating about the connection portion of the foot fitting.
Figure 21:
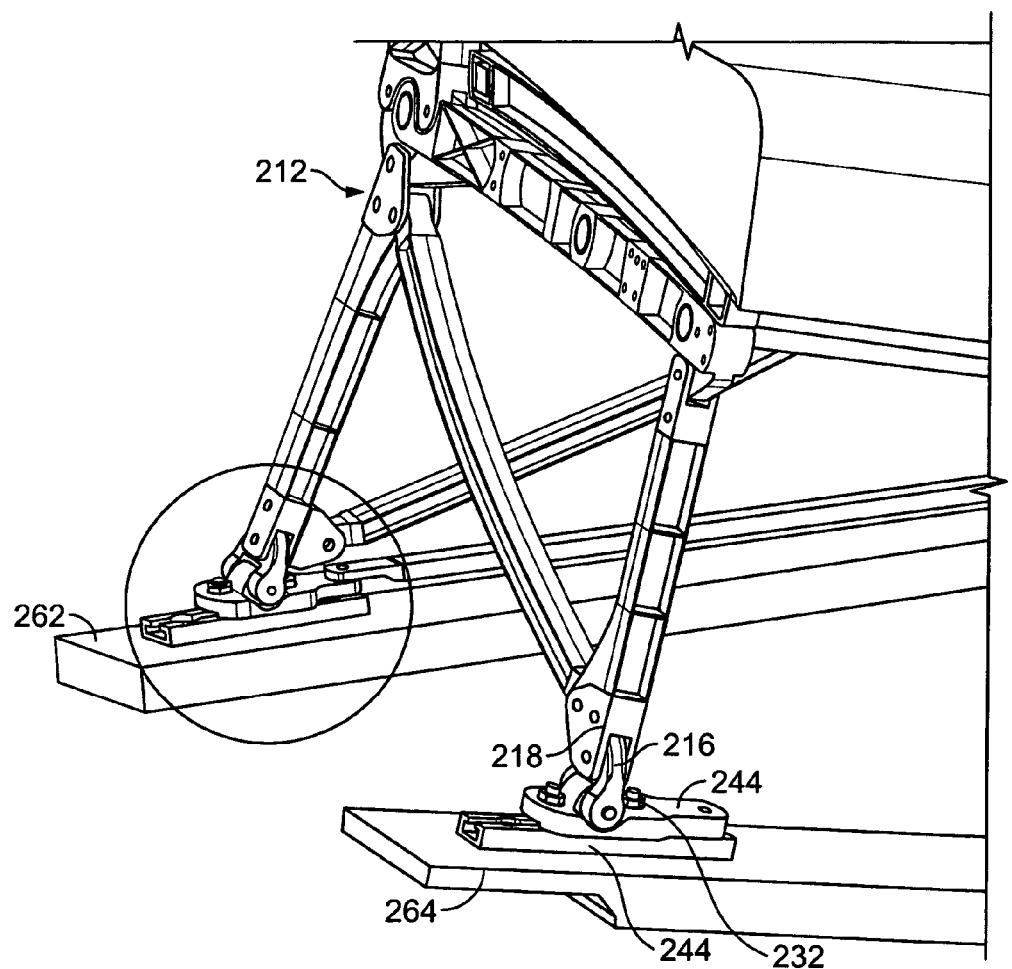
FIG. 21 is a perspective view showing a seat frame attached to the structural frames in the floor of an aircraft using the foot fitting described in this invention.

For example, as shown in FIG. 8 and 9(a), when the aircraft seat frame 12 is in an unloaded or neutral position, the leg 18 of the seat frame 12 is aligned directly up and down with respect to the connection portion 16 of the foot fitting 14. When additional g-forces are placed on the seat frame as a result of, for example, an emergency landing, the leg 18 swivels or rotates forward, as shown in FIG. 9(b) and tilts at an angle up to about ±10° with respect to the vertical about the connection portion 16. This tilting of the leg frame 18 with respect to the connection portion 16 continues until the aircraft has slowed sufficiently so that the dynamic loading caused by the deceleration of the aircraft has dissipated, at which time the leg 18 of the seat frame 12 may revert back to the unloaded position vertical to the connection point 16. Of course, should the aircraft experience rapid acceleration on takeoff, the leg 18 of the seat frame 12 rotates in the opposite direction toward the rear of the aircraft in the same manner as described above.

As used herein, vehicle is defined to mean a device for carrying or transporting something including, but not limited to, aircraft such as an airplane or helicopter.

FIGS. 10-18 show another embodiment of the invention in which the fitting 114 is comprised of a base 144, a connection portion 116 adapted to mate with a leg 118 of the aircraft seat frame 112, the connection portion 116 extending from the base 144 and having an opening 120 therethrough a fastener 115 extending from the base 144 and securing the base 144 to the floor (not shown), and an articulating connection 122 attached to the leg 118 of the aircraft seat frame 112 and extending through the opening 120 in the connection portion 116. In one version of this embodiment, the base 144 has an opening 130 therethrough, and a retaining screw 132 extends through the opening 130 securing the fitting 114 to the floor.

In one version of the attachment assembly, the retaining screw 132 is used only with rear foot fitting 114. In using a rear foot fitting 114(a) in combination with a front foot 114(b) fitting, it becomes possible to remove the entire seat frame 112 by simply loosening the retaining screw 132 and then sliding the at least one fastener 115 extending from the base 144 of both the front and rear fitting 114(a) and 114(b) until the fasteners are aligned with an opening 125 in the track assembly 124 (see FIG. 14) and then lifting the seat frame 112 out of the track assembly 124. Although it is theoretically possible to use a rear foot fitting 114(a) that has only one fastener 115 extending into the track assembly 124, should the fittings 114 be used in a land vehicle, in order to satisfy the requirements of FAR §25.562 it is recommended that at least three fasteners 115 be used as is shown in FIGS. 10, 12, 13 and 17.

In still another embodiment of the invention, as shown in FIGS. 19-36, the attachment assembly is comprised of a base member 244 attached to the floor of the aircraft, and a connection member 216 pivotally connected to the base member 244, the connection portion 216 having an 220 opening. In one version of this embodiment, a first bolt 211 pivotally attaches the connection member 216 to the base member 244 and a second bolt or articulating bushing 222 pivotally attaches the seat leg 218 to the connection member 216. In still another version of the embodiment, the first bolt 211 is substantially perpendicular to the second bolt or articulating bushing 222. By pivotally connecting the connection member 216 to the base member 244, the connection member 216 and set leg 218 is free to tilt up to an angle of approximately ±45° with respect to the vertical.

As shown in FIGS. 20-22 and 34-36, the fitting 214 of this embodiment, allows the seat frame 212 to rotate in both the x and z axis so as to absorb the dynamic loads in two different axes.

Figure 22:
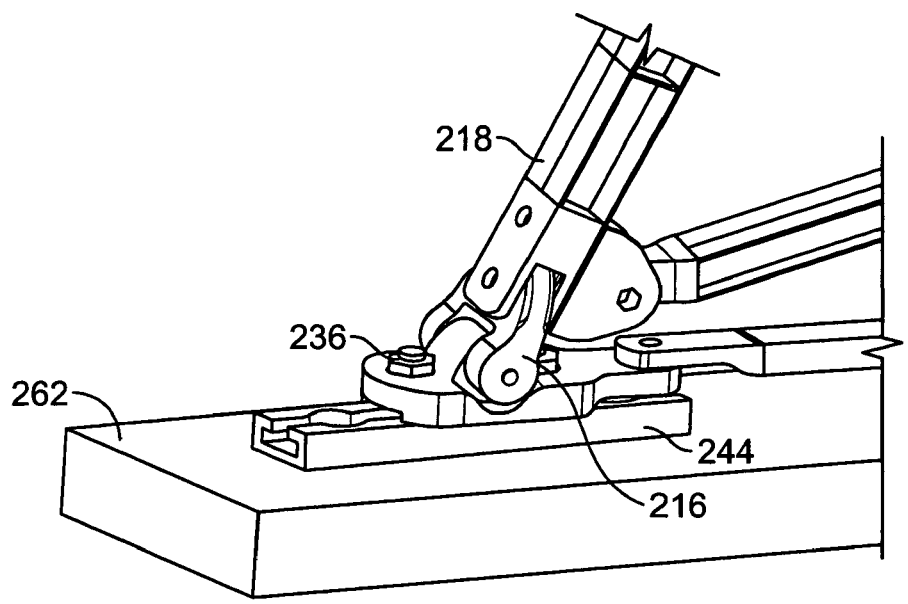
FIG. 22 is a close-up view of the foot fitting encircled in FIG. 21.
Figure 23:
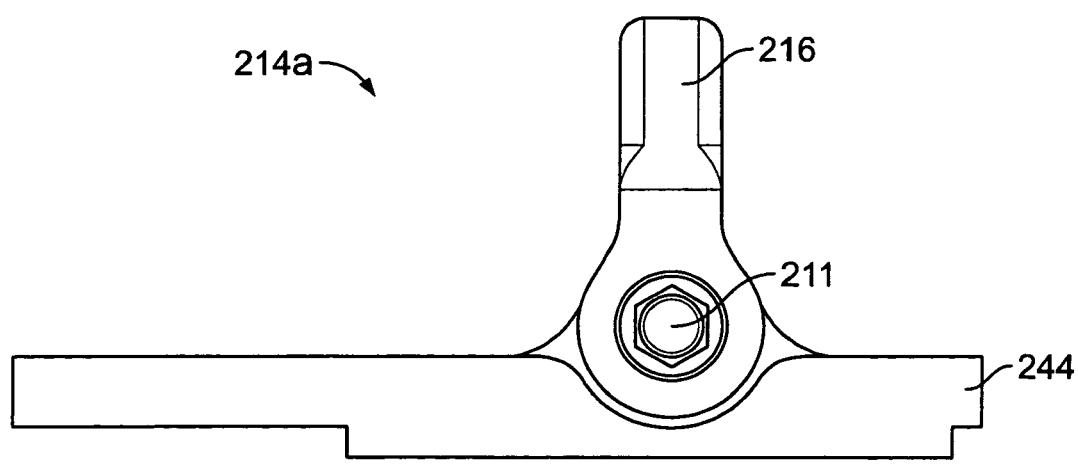
FIG. 23 is a side view of one version of the foot fitting showing the connection portion bolted to the base member.
Figure 24:
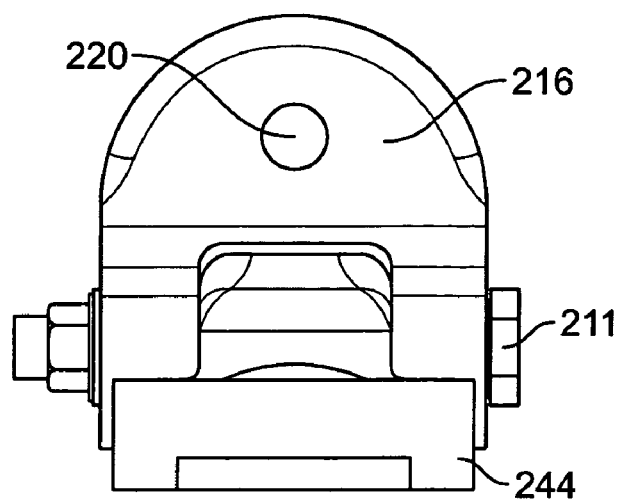
FIG. 24 is a front view of the foot fitting of FIG. 23.
Figure 25:
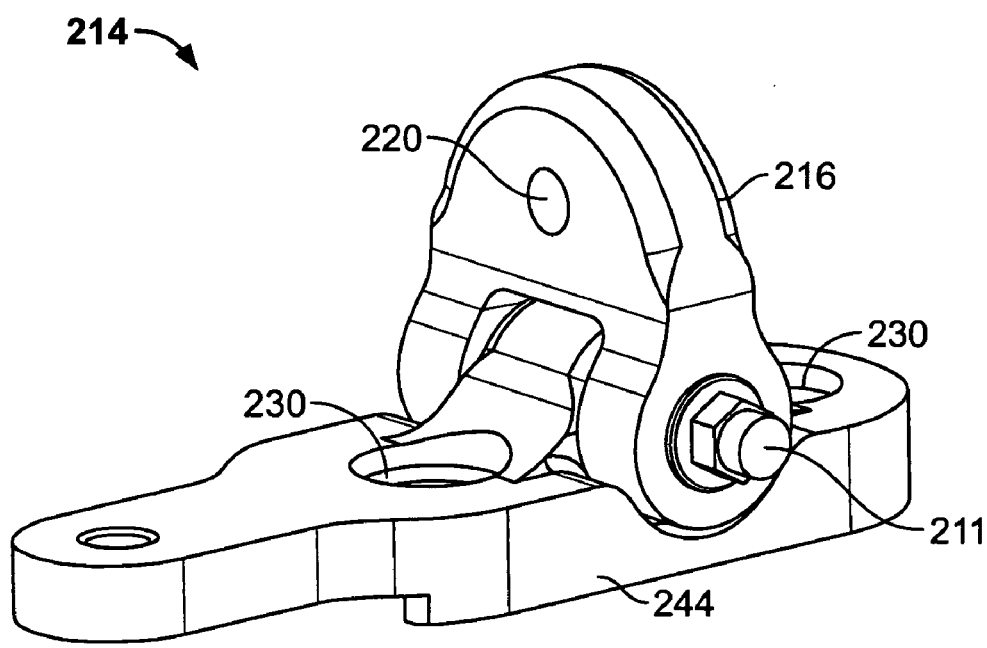
FIG. 25 is a perspective view of the foot fitting of FIG. 23.
Figure 26:
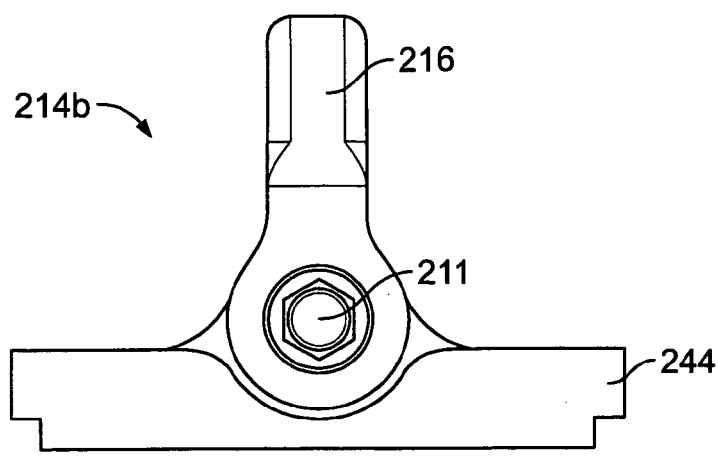
FIG. 26 is a side view of another version of the foot fitting, particularly the version used to attach the front portion of a seat frame to the floor.
Figure 27:
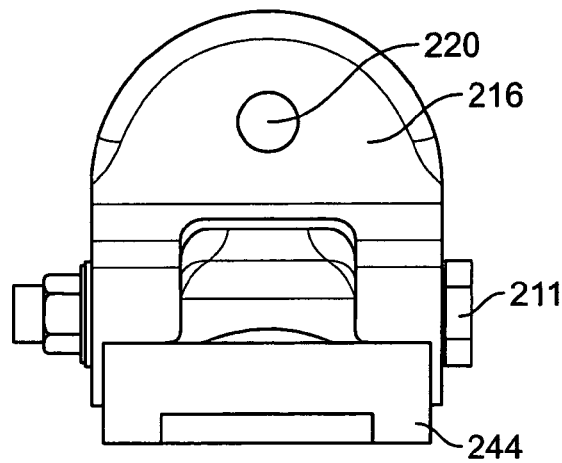
FIG. 27 is a front view of the foot fitting shown in FIG. 26.
Figure 28:
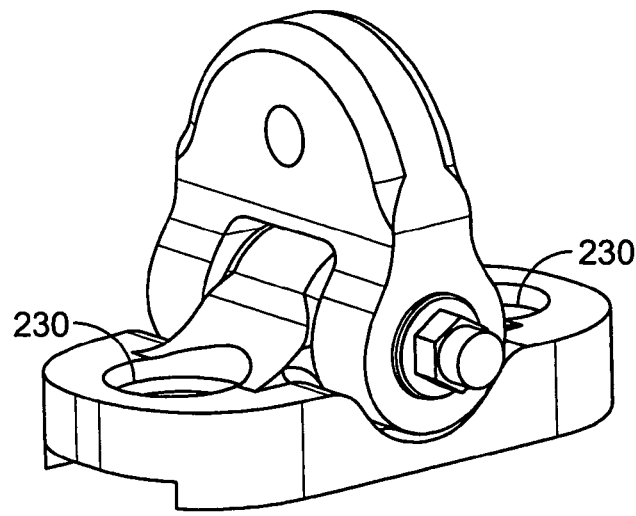
FIG. 28 is a perspective view of the foot fitting shown in FIG. 26.
Figure 29:
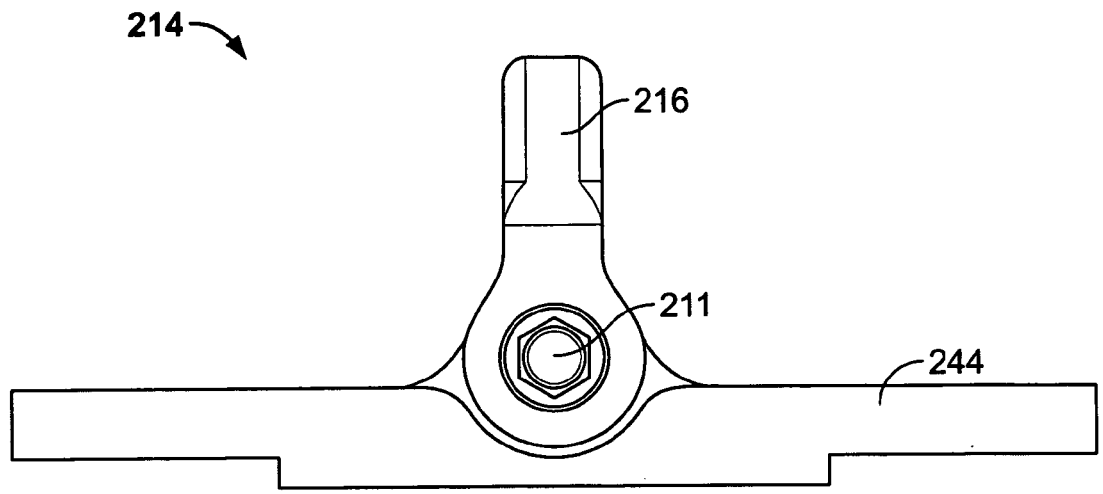
FIG. 29 is still another version of a foot fitting made in accordance with the invention.
Figure 30:
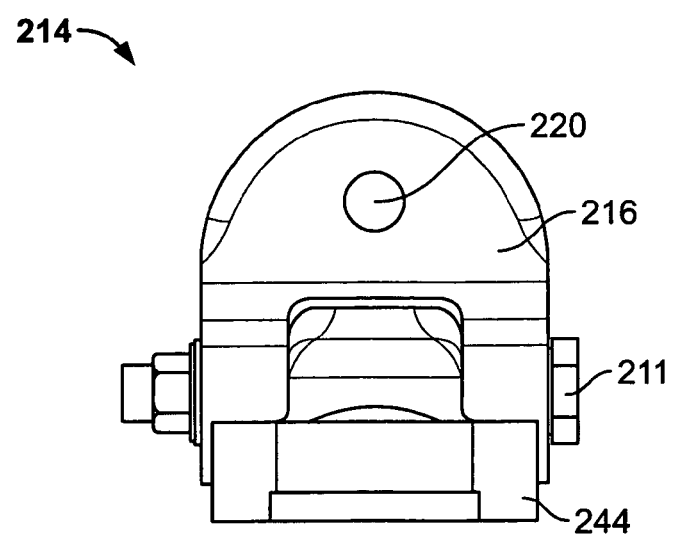
FIG. 30 is a front view of the foot fitting shown in FIG. 29.
Figure 31:
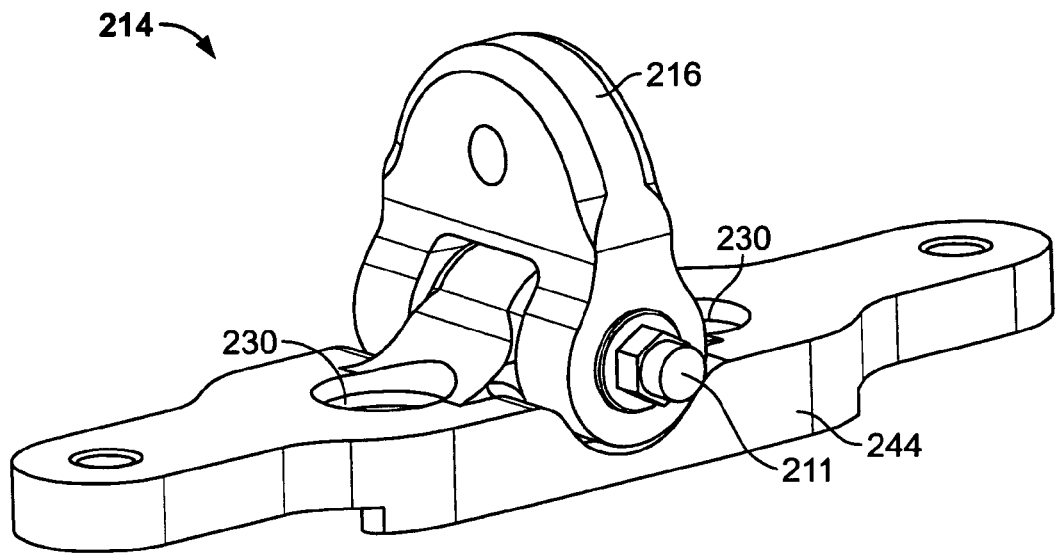
FIG. 31 is a perspective view of the foot fitting shown in FIG. 29.
Figure 32:
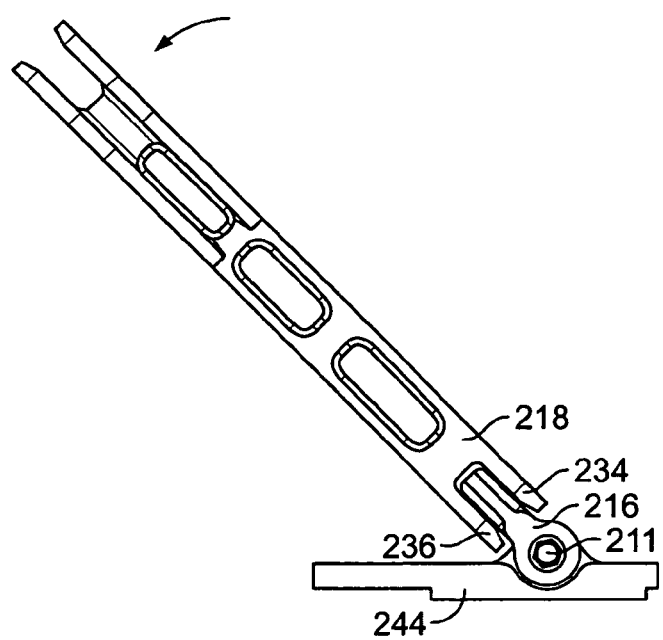
FIG. 32 is a side view of the foot fitting showing the connection portion rotated from a neutral position in response a dynamic load imparted on a seat leg.
Figure 33:
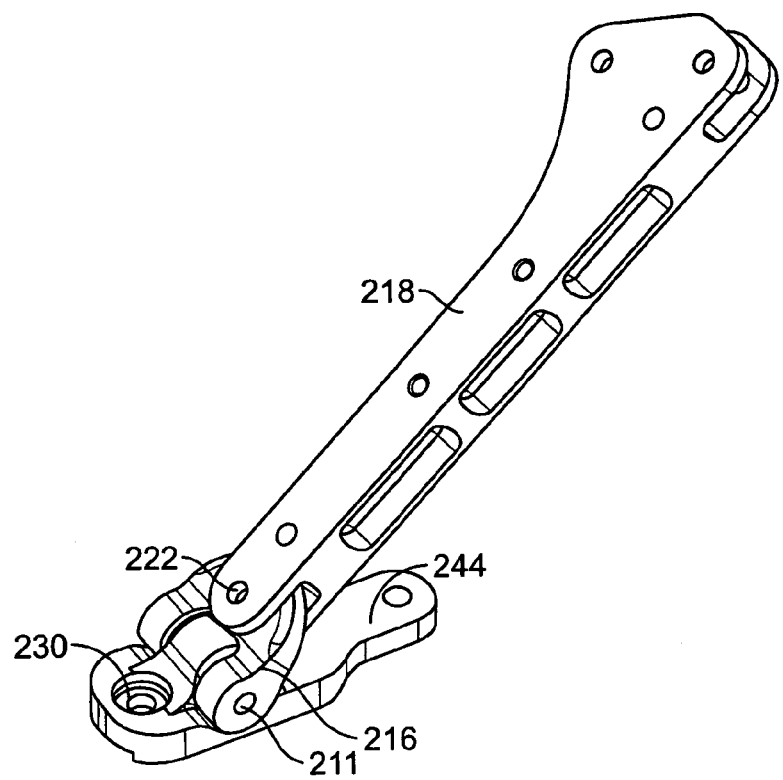
FIG. 33 is a perspective view of a foot fitting attached to a leg frame.
Figure 34:
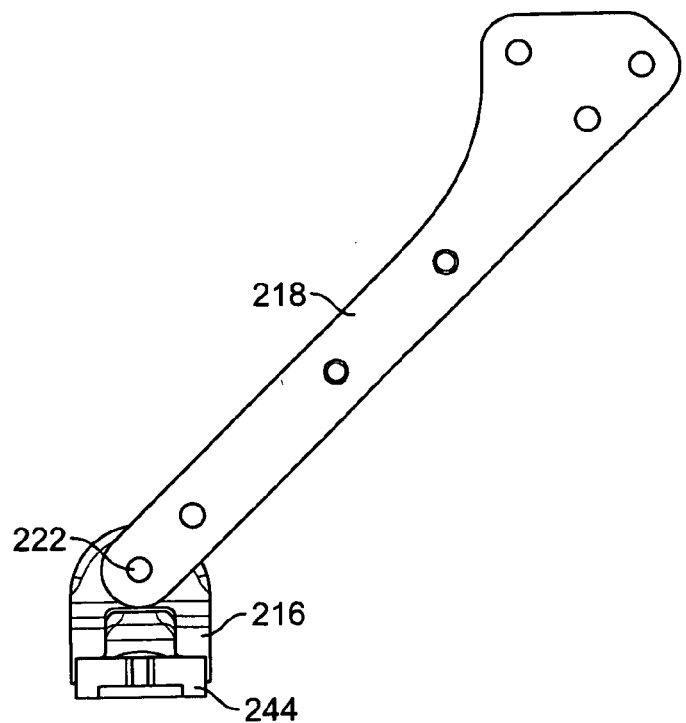
FIG. 34 is a front view a foot fitting connected to a leg of a seat frame.
Figure 35:
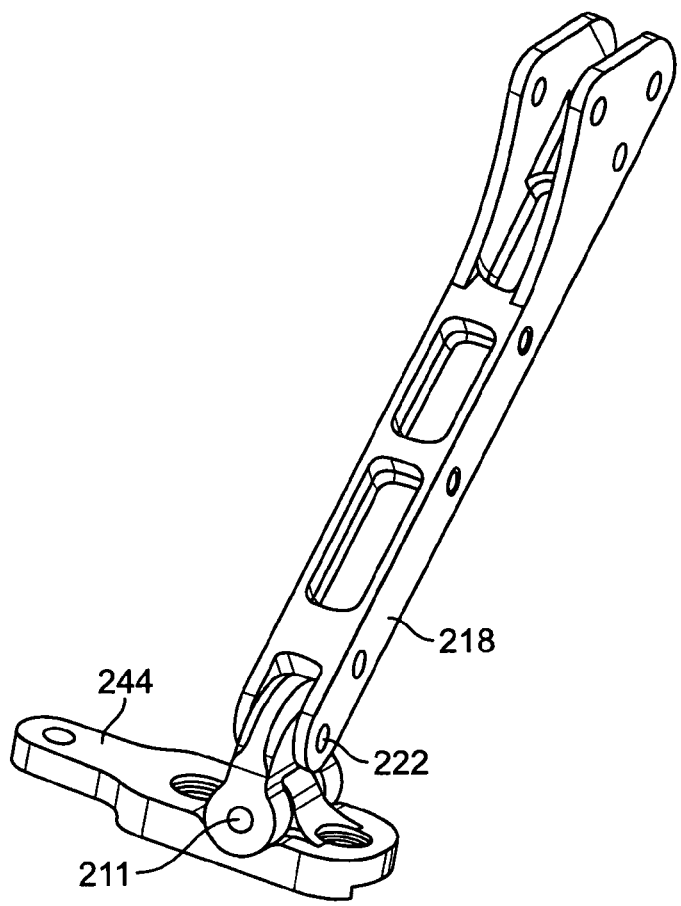
FIG. 35 is a perspective view of a foot fitting connected to a leg of a seat frame.
Figure 36:
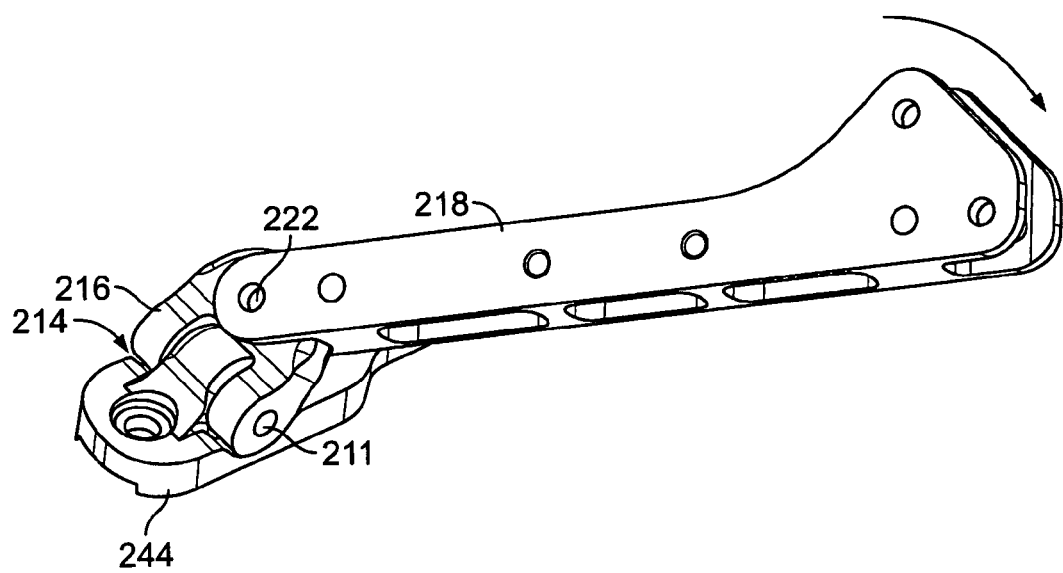
FIG. 36 is a perspective view of a foot fitting showing the leg portion of the seat frame rotated in the z-axis in response to a dynamic load imparted on the seat.

The attachment assembly 210 may also include a floor mount or track assembly 224 that is mounted to the support beams 262, 264 running fore and aft in the floor of the vehicle or aircraft. In the event of an emergency landing resulting in significant g-forces, the support beams 262, 264 may be deformed by pitching or rolling as shown in FIG. 22. This deformation of the support beams 262, 264 will cause the seat frame 212 to pitch or roll. Because the seat frame 212 is pivotally connected to the connection portion 216 of the foot fitting 214, which in turn is pivotally connected to the base 244 of the fitting 214, the seat frame 212 is better able to absorb the dynamic loads generated along the pitch and roll axes with collapsing or being ripped from the floor of the aircraft.

As shown in FIGS. 19-22, in one version of the embodiment, the foot fitting 214 may be secured to a floor mount or track assembly 224 using retaining screws 232 that pass through openings 230 in the base 244 of the fitting 214. Furthermore, as shown in FIGS. 19-22 and 32-36, the leg portion 218 of the seat frame (not shown) may terminate in a fork having a first and second prong 234, 236. The connection portion 216 of the fitting 214 is positioned between, and pivotally attached to the two prongs 234, 236 so that the leg frame is free to articulate in the roll axis should a dynamic load be encountered.

FIGS. 23-31 show different versions of the embodiment in which the connection portion 216 is pivotally connected to the base member 244 of the foot fitting 214. As is clear from these embodiments, the shape of the base member 244 may be altered depending on whether the foot fitting 214 is used to attach the rear or front leg of the seat frame.

In yet another embodiment, the invention is directed to a kit for mounting a seat frame to the floor of a vehicle. More particularly, the invention is directed to a kit for mounting an aircraft seat frame 12 to the floor of an aircraft. The inventive kit is comprised of ised of at least one floor mount secured 24 to the floor of the aircraft, a front (e.g., 114(b), 214(b)) and a rear (e.g., 114(a), 214(b)) foot fitting each attached to the floor mount 24 by at least one fastener 115, and secured to the floor mount 24 by a retainer engagement screw 132. Each of the footings 14 has a base member 24 with a connection portion 16 adapted to mate with the aircraft seat 12. The connection portion 16 has an opening 20 extending therethrough, and a pivoting connector 22 is located within the opening and attached to the aircraft seat.

As with other embodiments described herein, the floor mount 24 may be a track assembly that includes a plurality of openings. The track assembly may be comprised of a first track and a second track substantially parallel to the first track. In one particular version of the kit, the rear foot fitting (e.g., 114(a), 214(a)) is attached to the floor mount 24 by at least three fasteners 15.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. An attachment assembly for mounting a seat frame to a floor of a vehicle, the attachment assembly comprised of:
   a foot fitting connected to the floor, the foot fitting having a base having a first and a second attachment point, each point defining an opening therethrough;
   a connection portion extending from the base between the first and second attachment points, the connection portion adapted to mate with a leg of the aircraft seat frame, the connection portion defining an opening extending therethrough; and
   an articulating connection attached to the leg portion and extending through the opening in the connection portion, wherein a first and second parallel axis extends through the first and the second attachment opening, respectively, and a third axis extends perpendicular to the first and second axes through the opening in the connection portion.

2. The attachment assembly of claim 1, wherein the vehicle is an aircraft.

3. The attachment assembly of claim 2, wherein the aircraft is an airplane.

4. The attachment assembly of claim 1, wherein:
   a floor mount is secured to the floor, and
   the foot fitting is connected to the floor mount.

5. The attachment assembly of claim 1, wherein the articulating connection is a bushing.

6. The attachment assembly of claim 5, wherein the bushing is manufactured of bronze; and
   the bushing is swaged in place such that it is free to rotate in the opening.

7. The attachment assembly of claim 4, wherein at least one fastener extends from a bottom of the foot fitting, whereby the at least one fastener is capable of being secured in the floor mount.

8. The attachment assembly of claim 7, wherein:
   the floor mount is in the form of a track assembly having a plurality of openings; and
   the at least one fastener mounts in registry with an opening in the track assembly.

9. The attachment assembly of claim 1, wherein:
   the foot fitting includes at least one attachment opening; and
   a retaining screw extends through the at least one attachment opening into the floor mount, thereby securing the foot fitting to the floor of the aircraft.

10. The attachment assembly of claim 1, wherein:
    the leg frame terminates in a fork having a first and a second prong spaced apart from one another;
    the connection portion is positioned in the space between the first and second prong; and
    the articulating connection extends through the opening in the connection portion and includes a first and second end that attaches to the first and second prongs of the leg frame, respectively.

11. The attachment assembly of claim 10, wherein:
    the first and second prongs are separated by a first distance;
    the prongs extend from the leg frame a second distance; and
    the second distance is greater than the first distance.

12. A floor mounted fitting for an aircraft seat, the mounting fitting comprised of:
    a base having at least one floor attachment point the base defining a first and a second attachment opening;
    a connection portion adapted to mate with a leg of the aircraft seat, the connection portion extending from the base between the first and second attachment openings and defining an opening therethrough;

a fastener extending from the at least one floor attachment point and securing the base to the floor; and an articulating connection attached to the leg of the aircraft seat and extending through the opening in the connection portion.

13. An attachment assembly for mounting an aircraft seat frame to a floor of an aircraft, the attachment assembly comprised of:

an attachment fitting attached to the floor of the aircraft; and a connection member defining an opening therethrough adapted to mate with a leg of the aircraft seat frame, said connection member pivotally connected to the attachment fitting.

14. The attachment assembly of claim 13, wherein:

a first bolt pivotally attaches the connection member to the attachment fitting; and a second bolt pivotally attaches the seat frame to the connection member.

15. The attachment assembly of claim 14, wherein the first bolt is substantially perpendicular to the second bolt.

16. The attachment assembly of claim 13, wherein at least one fastener extends from the attachment fitting, the at least one fastener being capable of securing the attachment fitting to the floor of the aircraft.

17. The attachment assembly of claim 13, wherein:

a floor mount is secured to the floor of the aircraft; and the attachment fitting is attached to the floor mount.

18. The attachment assembly of claim 17, wherein:

at least one fastener extends from the attachment fitting;

the floor mount is in the form of a track assembly having a plurality of openings; and the at least one fastener attaches to the track assembly through at least one of the plurality of openings.

* * * * *